Aug. 7, 1945.   F. W. STAVELY ET AL   2,381,400
FUEL TANK
Filed July 20, 1944   3 Sheets-Sheet 1

INVENTORS
FREDERICK W. STAVELY
KENNETH L. EDGAR
AND
SAMUEL W. HOFFMAN
BY
ATTORNEYS

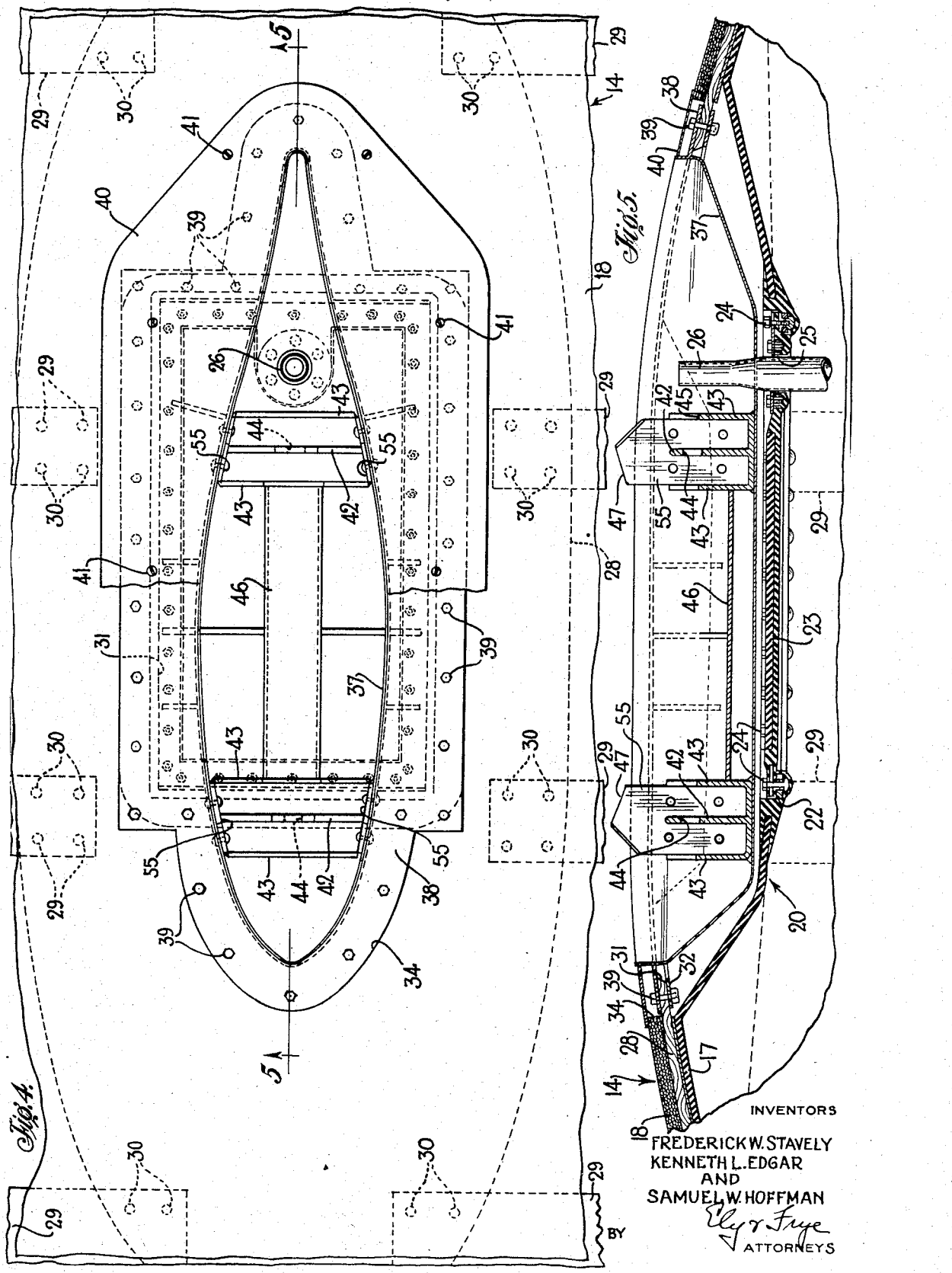

Aug. 7, 1945.  F. W. STAVELY ET AL  2,381,400

FUEL TANK

Filed July 20, 1944  3 Sheets-Sheet 3

Inventors
FREDERICK W. STAVELY
KENNETH L. EDGAR
AND
SAMUEL W. HOFFMAN

Attorneys

Patented Aug. 7, 1945

2,381,400

UNITED STATES PATENT OFFICE 2,381,400

FUEL TANK

Frederick W. Stavely, Kenneth L. Edgar, and Samuel W. Hoffmann, Akron, Ohio, assignors to The Firestone Tire & Rubber Company, Akron, Ohio, a corporation of Ohio Application July 20, 1944, Serial No. 545,834

4 Claims. (Cl. 244—135)

This invention relates to fuel tanks for aircraft, and more especially it relates to fuel tanks that carry supplemental supplies of fuel for airplanes, and which may be jettisoned or dropped therefrom when empty, or prior thereto if desired.

Jettison fuel tanks usually are used on fighter aircraft to increase their range of operation and to enable them to accompany the long range bombing airplanes on their missions. They also are used for ferrying airplanes to bases, especially across oceans where distances are vast. Heretofore, such fuel tanks have not been provided with bullet-sealing facilities since it was not intended that they should be carried into combat. It is now proposed to equip fighter aircraft with self-sealing jettison fuel tanks for long distance fighting and reconnaissance purposes so that the tanks can be carried through flak and gun fire. The auxiliary fuel tanks are to be supported by bomb racks that are mounted on the craft and which be employed interchangeably for carrying bombs on short bombing missions.

The chief object of the invention is to provide an improved jettison fuel tank for aircraft. More specifically the invention aims to provide a fuel tank of the character mentioned that will be light in weight; that will include bullet-sealing features; that will employ the minimum of metal in its construction; that will be of skin-stressed monococque design and not require bulk-heads or other internal supporting structures; that has improved supporting and releasing means for connection with and support by the bomb-shackle of an airplane; that includes means to prevent swaying of the tank during flight; that will not lose contact with the airplane due to gunfire; and that will not be deformed due to gunfire or due to loading conditions during flight. Other objects will be manifest as the description proceeds.

Of the accompanying drawings:

Fig. 4 is a detail plan view, on a still larger scale, of the central portion of the structure shown in Fig. 3;

Fig. 5 is a section on the line 5—5 of Fig. 4;

Figure 1:
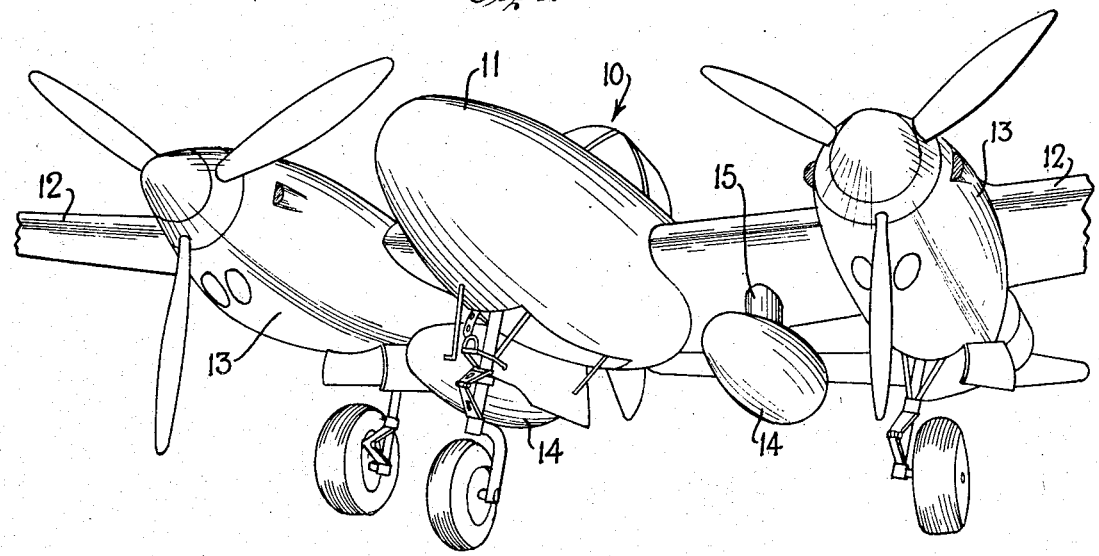
Fig. 1 is a fragmentary perspective view of an airplane equipped with the improved jettison fuel tanks.

Referring first to Fig. 1 of the drawings, there is shown a light bomber airplane 10 of the twin-engine type, which airplane comprises the usual hull or fuselage 11, wings 12, 12, and outboard engine nacelles 13, 13 mounted on said wings. Two of the improved fuel tanks, each designated as a whole by the numeral 14, are suspended from the bottom of the wings 12, between the fuselage 11 and engine nacelles 13. Each fuel tank is releasably attached to a wing by means of a bomb shackle hereinafter more fully described, which bomb-shackle is enclosed by suitable fairing 15 to reduce wind resistance. For the same reason the fuel tanks 14 are of streamline shape with substantially uninterrupted surface.

The fuel tank 14 is of monococque design, and comprises an internal, bullet sealing lining or cell 17, and a rigid, external, non-metallic shell or casing 18. The lining 17 is composed of a plurality of plies of treated fabric and sealing composition, with an inner facing of material that is resistant to the action of hydrocarbon fuels. Since the composition of the lining is not a part of the present invention, a more detailed description thereof will not be given. At the top of the tank, in the medial region thereof, the lining 17 has a flattened region 20, Figs. 5 and 6, in which is located a manhole or access opening 21, the latter being rectangular in shape and having a metal reinforcing element 22 of similar shape built into its structure. The manhole 21 is closed by a cover 23 that is composed of composition similar to that employed in the remainder of the cell 17, and which has a reinforcing of metal in the margin thereof, said cover being secured in place by a plurality of cap screws 24 that extend through said cover and are threaded into the reinforcing 22 around the manhole. Adjacent its rear end the manhole cover 23 is formed with a marginally-reinforced aperture 25 through which extends a pipe 26 that is utilized in withdrawing fuel from the tank. The access opening 21 is large enough to enable a small man to enter the tank for any purpose that may arise.

Figure 6:
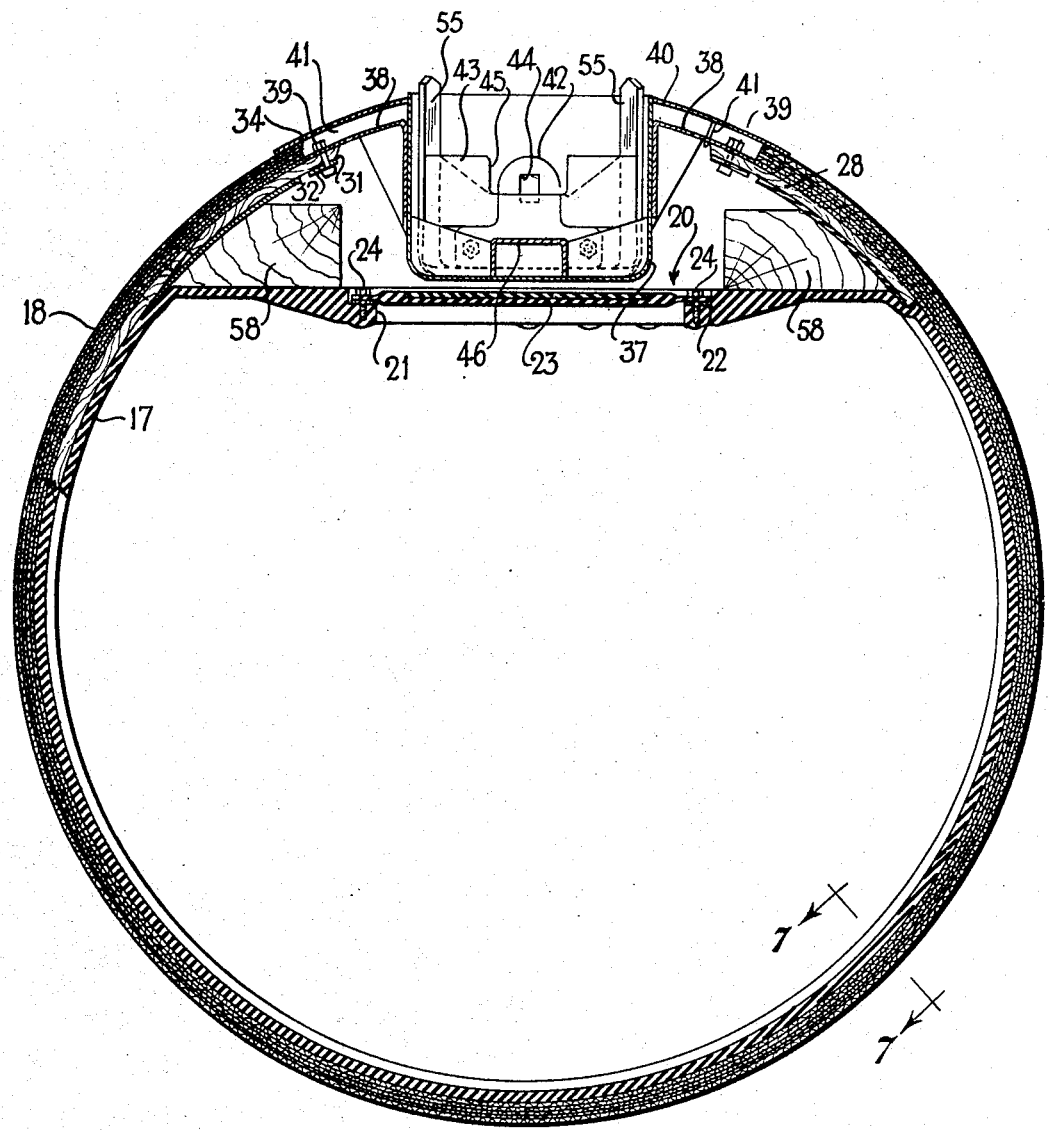
Fig. 6 is a transverse section of the fuel tank.

Positioned at the top of the cell 17, and covering a substantial region thereof, including part of the flattened region 20, is a canopy 28 that is composed of plywood. Said canopy is of oval shape in plan, and is longitudinally and transversely arcuate in section so as to conform to the general contour of the tank. Circumscribing the cell 17 are a plurality of girth straps or hoops 29, 29, herein shown as four in number. The straps 29 are composed of plywood, and have skived ends that are secured to complementally skived portions on the margin of the canopy 28 by means of wood screws 30 and glue, as shown in Fig. 6. The canopy has a relatively large central opening 31 that is located over the flattened medial region 20 of the cell 17, the shape of said opening being somewhat irregular, as will be apparent from Figs. 4 and 5. The margin of the opening 31 is reinforced by a metal backing plate 32 attached to the under or concave side thereof, said backing plate formed with a longitudinal series of threaded apertures therethrough for a purpose presently to be explained.

The shell or casing 18 of the tank 14 is composed of plies of fabric impregnated and bonded to each other with a suitable heat-hardened plastic composition. Of the plastic compositions found suitable for the purpose may be mentioned one composed of urea-formaldehyde and Buna S synthetic rubber, and another composed of phenolic resin and Buna S. When the first mentioned composition is used, the cell or lining 17 must be vulcanized before the shell or casing 18 is constructed thereon since said composition is injured by the higher temperature required to vulcanize the cell. When the second composition is used in the shell, both lining and shell may be vulcanized at the same time if desired. The vulcanized shell is dense and hard, and has substantial strength.

Figure 7:
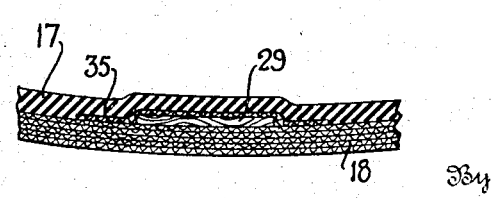
Fig. 7 is a section on line 7—7 of Fig. 6.

The shell or casing covers all of the cell 17 including the hoops 29, and all of the canopy 28 thereon except for an area adjacent the margin of the opening 31 therein, the margin of the shell about said opening being designated 34. Strips of bonding material 35 are interposed between the lining 17 and hoops 29 and extend laterally of the latter between lining and shell, as shown in Fig. 7, said strips uniting with the said elements, upon vulcanization, and constituting a local bond between them. Similar bonding material is applied to the under side of the canopy and around the peripheral margins thereof to provide a union between the canopy and the shell and lining, and to prevent the entrance of steam therebetween when lining and shell are vulcanized at the same time.

Mounted within the opening 31 of the canopy is a deep metal pan 37 that has a marginal flange 38 that rests upon the exposed portion of the canopy within the shell-opening defined by the margin 34, said pan-flange being secured to the canopy by a plurality of cap screws 39, 39 that extend through the flange and canopy and are threaded into the metal backing plate 32 of the canopy. A thin metal cover plate or fairing 40 fitting closely around the pan 37 overlies the flange 38 and margin 34 of the shell opening, and conceals the cap screws 39. The fairing is secured in place by countersunk screws 41 that are threaded into the flange 38. Welded and/or riveted in the pan 37 at two spaced apart points are respective brackets that extend completely across the same, each bracket comprising a central web 42 and reinforcing webs 43, 43 at opposite sides thereof. Each of said central webs is formed with an aperture 44 therein, and the tops of the webs 43 are centrally notched at 45 substantially as deep as the bottom of said aperture. Between the said brackets the pan is reinforced by a longitudinally extending inverted channel 46 welded to the bottom of the pan. Said brackets have end walls 55 that extend upwardly above the top margin of the pan, the upper margin of each of said end walls being formed with two oblique surfaces meeting at a point, one of said oblique surfaces, designated 47, being provided for a purpose presently to be explained. The bottom of the pan is formed with a suitable aperture to enable the fuel pipe 26 to extend therethrough.

The fuel tank is suspended from an aircraft through the agency of bomb shackles that engage the webs 42 of the brackets in pan 37 and extend through the apertures 44 therein. The bomb shackles are of the conventional type used for releasably carrying bombs, and are indicated at 49, 49, Fig. 2. The fairing 15 that surrounds the bomb shackles 49 is of the same body contour as the pan 37, and is arranged to be received within the latter when the fuel tank is suspended from the bomb shackles. The bottom margin of the fairing 15 is shaped to conform to the contour of the bottom of the pan 37, and is notched at 50, 50 on each side thereof to span the webbed brackets within the pan. When the fuel tank is suspended from the bomb shackles, the end walls 55 of the said brackets are disposed exteriorly of the fairing 15, the oblique marginal surfaces 47 of said end walls engaging complementally oblique faces 51, 51 formed on opposite ends of respective bearing strips 52 that are mounted on opposite sides of the fairing structure 15. The arrangement assures accurate registry of the fuel tank with its supporting structure, and provides stability by preventing side sway of the fuel tank.

Figure 2:
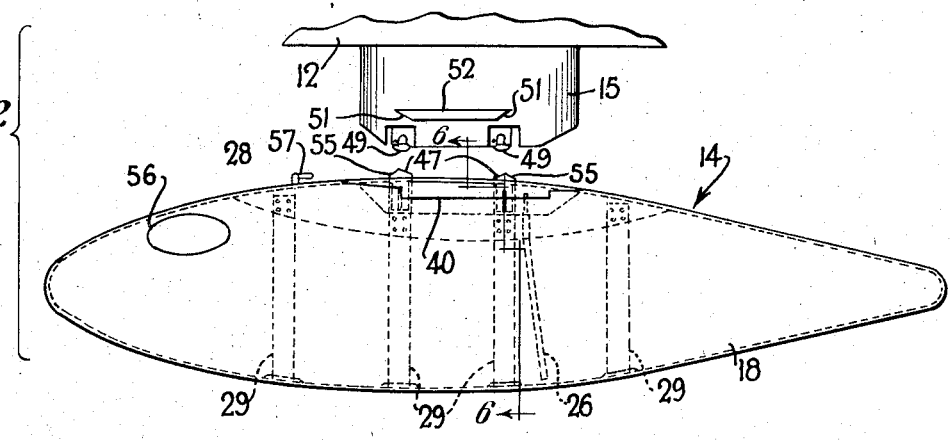
Fig. 2 is a side elevation, on a larger scale, of the improved fuel tank, and a portion of the bomb-shackle structure to which it is attachable.
Figure 3:
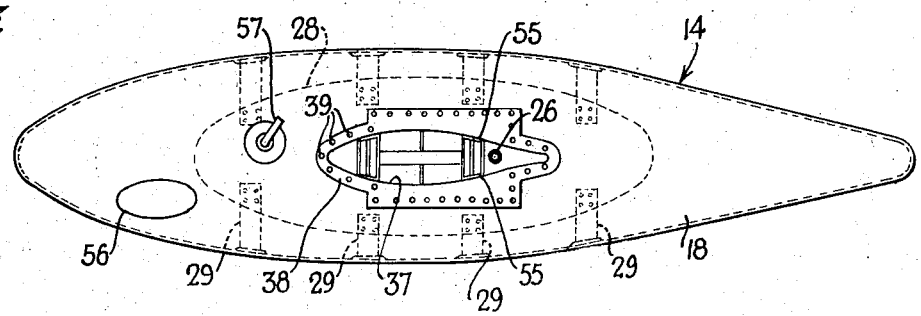
Fig. 3 is a plan view of the fuel tank shown in Fig. 2.

In addition to the features previously set forth, the fuel tank is provided with a suitable filling opening located at 56, Figs. 1 and 2, it being understood that said opening has a covering that is flush with the surface of the shell 18. The tank also is provided with a vent opening at 57. Preferably some of the space between the canopy 28 and the flattened region 20 of the lining or cell 17, at each side of pan 37, is filled with suitably shaped blocks of wood 58, Fig. 6, which may be of balsa because of its light weight.

The invention provides a fuel tank that will hold its shape in flight and under all conditions of loading, yet which employs but little metal in its construction. The cell or lining 17 does not require internal braces or bulkheads to retain it in proper shape and prevent collapse, yet there is no such union of shell and lining such as would impair the bullet-sealing characteristics of the latter. The entire load of the tank is carried by the stressed skin or shell 18 thereof, and the presence of the rigid plywood canopy 28, which extends about 30% of the area of the top of the tank, insures adequate distribution of the load. Furthermore, the arrangement for attaching the tank to an aircraft prevents swaying of the tank during flight.

Modification may be resorted to without departing from the spirit of the invention or the scope thereof as defined by the appended claims.

What is claimed is:

1. A fuel tank of the character described comprising a fuel cell or lining of resilient composition, a shell or casing of rigid non-metallic composition substantially enclosing the same, a rigid plywood canopy of generally elliptical shape interposed between the cell and casing locally at the top of the tank, a portion of said canopy being exposed through an opening in the casing, plywood hoops encircling the cell between the latter and the casing, the ends of the hoops being secured to the canopy at the perimeter thereof, and means attached to the canopy for suspending the tank from a supporting structure.

2. A combination as defined in claim 1 including means bonding the canopy and hoops to the cell and to the casing.

3. A combination as defined in claim 1 wherein the cell and the casing are composed of vulcanized composition, including vulcanized bonding material interposed between the cell and casing and uniting the same in local areas of their confronting surfaces.

4. A fuel tank of the character described comprising a fuel cell or lining of resilient composition, a shell or casing of rigid non-metallic composition substantially enclosing the same, a canopy of rigid material interposed between the cell and the casing, locally at the top of the tank, a portion of said canopy being exposed through an opening in the casing, means attached to said canopy for suspending the tank from a supporting structure, and hoops of rigid material encircling the cell between the latter and the casing, the ends of the hoops being secured to the canopy.

FREDERICK W. STAVELY.
KENNETH L. EDGAR.
SAMUEL W. HOFFMANN.